Oct. 9, 1934.  B. A. WITTKUHNS  1,976,648
REMOTE CONTROL SYSTEM
Original Filed Nov. 11, 1930    2 Sheets—Sheet 1
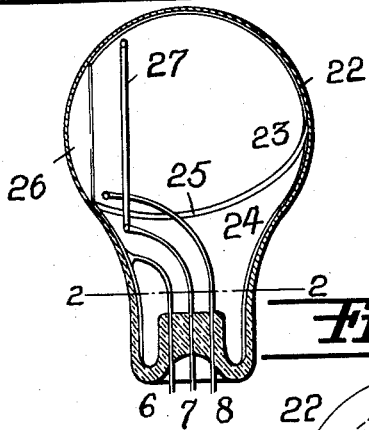
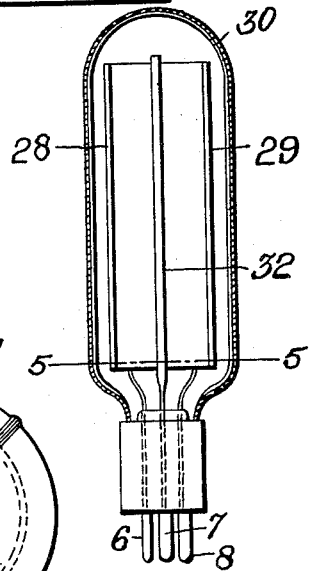
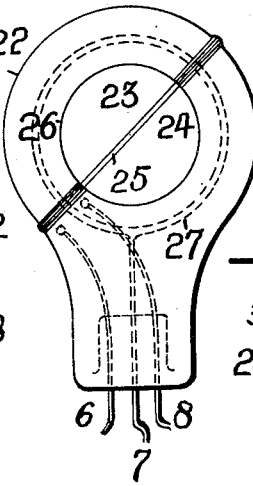
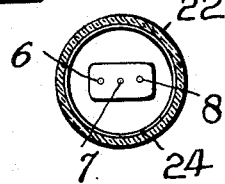
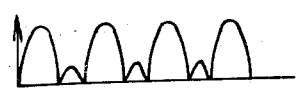
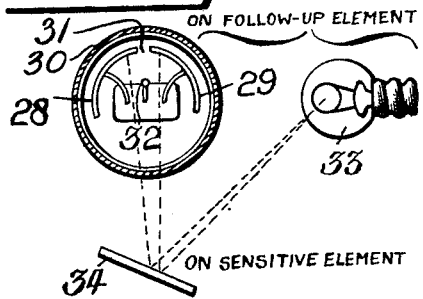
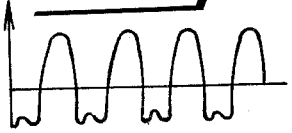
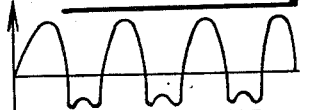
INVENTOR
BRUNO A. WITTKUHNS.
BY Herbert H. Thompson
his ATTORNEY.

Oct. 9, 1934.     B. A. WITTKUHNS     1,976,648
REMOTE CONTROL SYSTEM
Original Filed Nov. 11, 1930     2 Sheets-Sheet 2
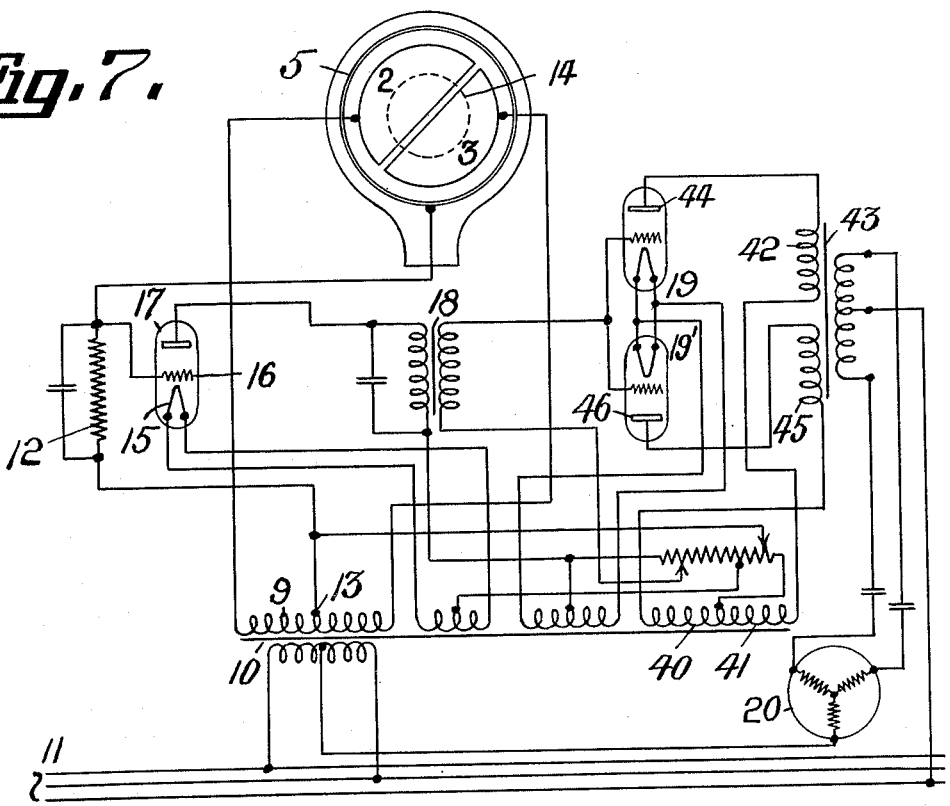
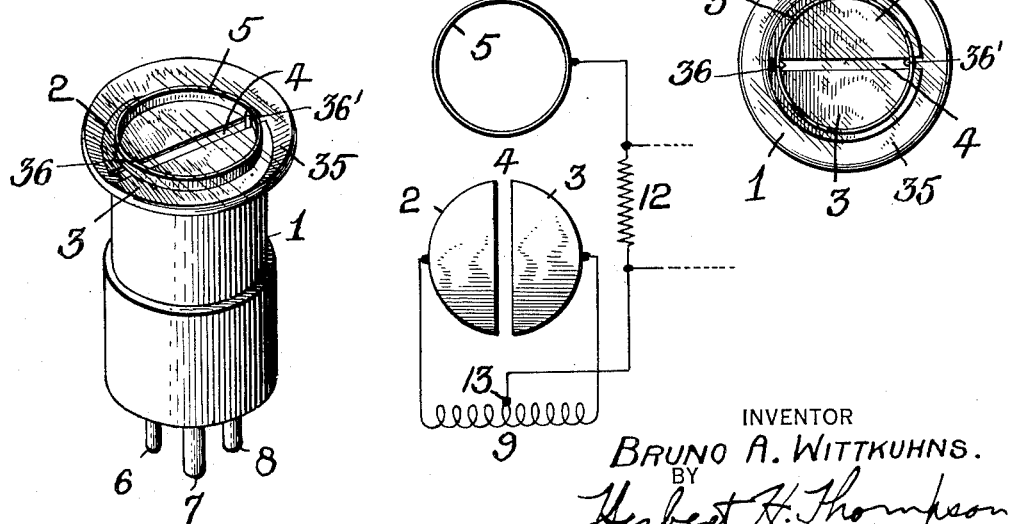
INVENTOR
BRUNO A. WITTKUHNS.
BY
Herbert H. Thompson
his ATTORNEY.

Patented Oct. 9, 1934

1,976,648

UNITED STATES PATENT OFFICE

1,976,648

REMOTE CONTROL SYSTEM

Bruno A. Wittkuhns, Chatham, N. J., assignor to Sperry Gyroscope Company, Inc., Brooklyn, N. Y., a corporation of New York Application November 11, 1930, Serial No. 494,863
Renewed October 1, 1932

8 Claims. (Cl. 250—41.5)

This invention relates to photo-electric cells and to control circuits therefrom especially adapted for the control of a follow-up element from a sensitive or other control element. The usual photo-electric cell has two electrodes, the cathode or light sensitive surface being usually in the form of a metallic deposit on the inner surface of a glass tube, and the anode being a ring or plate suspended within the cell opposite the said surface but so as to allow unrestricted flow of light. Such tubes, however, are unidirectional only as to current applied between the two parts thereof and where it is desired to employ the same as a control element in a follow-up or remote control system it has been necessary to employ two cells with the attendant disadvantage of errors due to internal changes within the cells or to work with a biased cell around an adjustable midpoint.

In carrying out my invention I have devised a single cell having two cathodes or light sensitive surfaces separated by a space of insulation and I employ in connection therewith preferably a single anode. The cell is preferably so placed that a beam of light falls equally on both cathodes but in case of relative movement between the follow-up and sensitive elements the beam of light is displaced, resulting in a greater flow of current in one direction than the other. I may employ either an alternating or a direct current supply in connection with my two cathode tubes, only the former, however, being illustrated, the differential output of the same operating thermionic relays to control a reversible follow-up motor through a reversal of phase, as will be explained.

Referring to the drawings in which several forms of the invention are shown,

Fig. 1 shows a vertical section of my two cathode tube.

Fig. 2 is a transverse section of the same on line 2—2 of Fig. 1.

Fig. 3 shows a side elevation of the same.

Fig. 4 shows a vertical section of a modified form of tube.

Fig. 5 shows a transverse section of the same, the manner of use of the tube being also shown.

Figs. 6—A, 6—B, 6—C, 6—D and 6—E are diagrams illustrating the method of operation of my tube when employed with an A. C. supply.

Fig. 7 is a wiring diagram showing the preferred method of connecting my tube with an A. C. supply for use as a controller of a follow-up element from a sensitive element.

Fig. 8 is a perspective view of the preferred form of my tube.

Fig. 9 is a plan view of the face of the same.

Fig. 10 is a diagram illustrating how the parts are electrically connected.

As above stated and referring first to Figs. 7 to 10 inclusive, I place within one tube 1 a pair of light sensitive surfaces or cathodes 2 and 3, which are separated by an insulating or unsilvered surface 4 which may simply be a space between the two plates 2 and 3 within the tube. Preferably this space or strip is inclined at an angle, say 45° to the vertical, so that the cell may be used to control both movements in azimuth and in elevation if desired. Within the cell I also place a ring 5 which acts as an anode for both cathodes 2 and 3. The cell, therefore, has three terminals 6, 7 and 8. If now the opposite ends of the secondary 9 of the transformer 10, the primary of which is supplied from an A. C. supply 11, are connected to the plates 2 and 3, they will always have normally equal but opposite potentials, each carrying current alternately, since, as is well known, a photoelectric cell acts as a rectifier and passes current in one direction only. I connect the anode 5 through a resistor 12 to the mid point 13 of the winding 9. The resistor 12, therefore, will carry current during the whole cycle. If, for instance, a circular spot of light, shown by dotted lines 14 in Fig. 7, is centered upon 2 and 3 so that both cathodes are illuminated equally, the current in the resistor 12 may be represented by the curve of Fig. 6—A, since the impedance of both halves of the cell is then equal. Such a current is rectified A. C. or D. C. with a so-called ripple in it. If, however, the spot of light wanders off in one direction or the other, the amount of illumination on both halves differs, causing a variation in the impedance of the balanced circuits containing the two electrodes and hence a variation in the output in the external circuit. The current curve in resistor 12 will then appear as shown in Fig. 6—B. Of course, if the beam is narrow, the brightest part would normally lie in the space between the cathodes, but they would still be equally illuminated, in the broad sense.

The potential at the ends of resistor 12 may be applied across the filament 15 and grid 16 of an amplifier tube 17 and the output led in the usual manner through transformer 18. The potential curve in the output side of the transformer 18 will then have a shape as shown in Fig. 6—C, being somewhat distorted A. C. which may be smoothed out by well known means. If the light wanders off to the other side, however, the other half of the current wave in Fig. 6—B becomes enlarged as shown in Fig. 6—D. The output potential of transformer 18 then becomes as shown in Fig. 6—E. By comparing Figs. 6—C and 6—E it will be seen that the two curves have a phase difference of 180° which is equivalent to reversing the direction of an A. C. motor. The thus created potential is further amplified by connecting the output side of transformer 18 to a pair of power amplifier tubes 19, 19', the transformer being connected in parallel to the grids of both tubes. The plate circuits of said tubes are energized from the A. C. supply through suitable secondary windings 40, 41 of transformer 10, the connections being such that their voltages are in opposite directions, so that at any given instant the plates 44 and 45 of tubes 19 and 19' have opposite polarities. One coil 42 of output transformer 43 is connected to plate 44 and an opposing coil 45 to plate 46. A Scott connection is shown between transformers 43 and 10 for obtaining the proper phase relations to give in connection with one phase of the supply, three phase reversible operation for motor 20 dependent on the direction of relative movement of the light spot and plates 2 and 3. For a more detailed explanation of the circuit shown reference is had to my prior application No. 433,562, filed March 6, 1930 for Remote control systems.

Where my cell is used to control the follow-up element from a sensitive element, both the cell 30 and light source 33 may be placed on the follow-up element rings as indicated in Fig. 5 and a mirror 34 placed on the sensitive element. This system will give an amplification of two before entering the amplifier system, thus giving the photo-electric system an advantage over an inductor system.

It is, of course, obvious that my cell may assume various forms depending on the uses to which the tube is to be placed. In Figs. 1, 2 and 3 is shown a photo-electric cell constructed according to my invention, but having the external appearance of the usual cell. However, it should be noted that the metal coating on the interior of the glass bulb 22 is divided into two parts 23 and 24 by a band of insulation or space 25 preferably diagonally placed across the interior of the bulb, the insulating band appearing to bisect the field of view through the window 26. As before, the anode is made in the form of a metallic ring 27 which, in this instance, is placed vertically and surrounds the window 26 but is not visible therethrough as it is of larger diameter than the window.

In Fig. 4 the photo-electric deposit is placed on a pair of hollow cylindrical sections 28 and 29 which are shown as mounted within an elongated tube 30 and spaced apart by a narrow slit 31 (Fig. 5). The anode in this instance may be in the form of a rod 32 extending through the middle of the tube.

My preferred form of tube shown in Figs. 8 to 10 represents quite a departure from the usual photo-electric cell. In this form the main body of the cell is formed of cylindrical metallic tubing and only the face 35 thereof need be covered with glass. The two cathode plates 2 and 3 may be in the form of thin sheet metal coated with the photo-electric sensitive coating, these plates being supported near the front of the tube by the lead-in wires. The ring-shaped anode 5 is supported above the plates by its lead-in wire or wires 36—36' which may pass through the insulating space 4 between the cathode plates.

The advantage of my cell over the usual cell with only one active surface is primarily in the simplicity of arrangement, as two cells of the common type would have to be used to achieve equally good results. These two cells would have to be of equal sensitivity over a long range of time, which is very difficult to maintain. The tubes are subject to changes in pressure and activity of their surfaces, and, as such changes never occur simultaneously in two cells, the balance of the controlled circuit will be upset. My cell, however, having two surfaces in one envelope, will not unbalance the circuit upon ageing or when its sensitivity changes, as both surfaces are changing at the same time, and as the pressure changes in the cell affect both parts equally. The same is true for control circuits, using one ordinary cell with a changing output, in which this output is balanced on a midpoint, by introducing a fixed counter impulse into the controlled device from an external source. If the cell ages or changes, this counter-impulse has to be adjusted to a new value in order to maintain balance, a disadvantage which has been eliminated by my cell.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a follow-up system, the combination with the sending and following element and a follow-up motor for the latter, of a controller for the motor including a source of radiation adapted to project a beam and a single photo-electric cell having two cathodes normally adapted to equally intercept said beam, and a common anode therefor, said beam and cathodes being adapted to be relatively displaced upon relative displacement of said sending and following elements, means for impressing normally balanced E. M. F.'s between said cathodes and the anode, and means for amplifying the differential output of the cell to drive said motor in a direction to maintain synchronism between the sending and following elements.

2. In a follow-up system, the combination with the sending and following element and a follow-up motor, of a controller for the motor including a source of radiation adapted to project a beam and a single photo-electric cell having two cathodes normally adapted to equally intercept said beam, and an anode therefor, supply means for impressing A. C. of different phase relation on the two cathodes, and means for amplifying and transforming the output thereof into A. C. of the proper phase relationship to the supply to drive said motor in the proper direction to maintain synchronism between the sending and following elements.

3. A photo-electric cell for controlling reversible motive means comprising a pair of photo-electric surfaces adapted to be connected to opposite polarity of an A. C. source, and an anode for receiving the electrical discharge from both surfaces in combination with a thermionic tube circuit also powered by said A. C. and having its grid potential controlled by said discharge, and a reversible motor also powered from said A. C. and governed as to torque and direction by the output of said tube.

4. In a follow-up system, the combination with the sending and following element and a follow-up motor and an A. C. supply, of a controller for the motor including a source of radiation adapted to project a beam and dual photo-electric means normally adapted to equally intercept said beam, means for impressing A. C. of different phase relation on said means, and means for amplifying and transforming the output thereof into A. C. of the proper phase relationship to the supply to drive said motor in the proper direction to maintain synchronism between the sending and following elements.

5. In a follow-up system, the combination with the sending and following element and a follow-up motor and an A. C. supply, of a controller for the motor including a source of radiation adapted to project a beam and dual photo-electric means normally adapted to equally intercept said beam, means for impressing A. C. of different phase relation on said means, means for converting the D. C. output thereof into A. C. of opposite phase, and means for amplifying and transforming the output thereof into A. C. of the proper phase relationship to the supply to drive said motor in the proper direction to maintain synchronism between the sending and following elements.

6. In a follow-up system, the combination with the sending and following element and a follow-up motor, of a controller for the motor including a source of radiation adapted to project a beam and a single photo-electric cell having two cathodes normally adapted to equally intercept said beam and a common anode therefor, said beam and cathodes being adapted to be relatively displaced upon relative displacement of said sending and following elements, means for normally impressing balanced E. M. F.'s between each cathode and the anode whereby variation in the position of said beam varies the relative impedance of the circuits containing said cathodes, and means responsive to said variation for amplifying the differential output of said circuits to drive said motor in a direction to maintain synchronism between the sending and following elements.

7. In a follow-up system, the combination with the sending and following element and a follow-up motor, of a controller for the motor including a source of radiation adapted to project a beam and a single photo-electric cell system having two cathodes normally adapted to intercept said beam, said beam and cathodes being adapted to be relatively displaced upon relative displacement of said sending and following elements, means for normally impressing balanced E. M. F.'s between each cathode and the anode therefor whereby variation in the position of said beam varies the relative impedance of the circuits containing said cathodes, and means responsive to said variation for amplifying the differential output of said circuits to drive said motor in a direction to maintain synchronism between the sending and following elements.

8. In a follow-up system, the combination with the sending and following element and a follow-up motor for driving the latter, of a controller for the motor including a single photo-electric cell having two cathodes normally adapted to equally intercept a beam positioned by the sending element, a common anode therefor, means for applying normally equal E. M. F.'s between each cathode and the anode whereby the outputs of the two halves of the cell are normally balanced, and electron tube means differentially actuated by said outputs, the output of which drives said motor in a direction to maintain synchronism between the two elements.

BRUNO A. WITTKUHNS.